United States Patent
Huang

(10) Patent No.: US 9,462,336 B2
(45) Date of Patent: Oct. 4, 2016

(54) TELEVISION CONTROL CHIP HAVING DATA PROTECTION FUNCTION AND METHOD FOR CONTROLLING TELEVISION SET

(71) Applicant: MStar Semiconductor, Inc., Hsinchu Hsien (TW)

(72) Inventor: Hung-Chi Huang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 30 days.

(21) Appl. No.: 14/509,210

(22) Filed: Oct. 8, 2014

(65) Prior Publication Data
US 2015/0098689 A1    Apr. 9, 2015

(30) Foreign Application Priority Data

Oct. 8, 2013   (TW) ............................. 102136373 A

(51) Int. Cl.
| | |
|---|---|
| *H04N 21/4147* | (2011.01) |
| *H04N 21/442* | (2011.01) |
| *H04N 21/4627* | (2011.01) |
| *H04N 21/433* | (2011.01) |
| *H04N 21/647* | (2011.01) |

(52) U.S. Cl.
CPC .... *H04N 21/44236* (2013.01); *H04N 21/4147* (2013.01); *H04N 21/4334* (2013.01); *H04N 21/4627* (2013.01); *H04N 21/64715* (2013.01)

(58) Field of Classification Search
None
See application file for complete search history.

(56) References Cited

U.S. PATENT DOCUMENTS

| | | | |
|---|---|---|---|
| 2008/0162925 A1* | 7/2008 | Okaya ................... | H04L 9/0844 713/155 |
| 2012/0177101 A1* | 7/2012 | van Der Schaar ............. | H04N 21/23439 375/240.01 |
| 2013/0166769 A1* | 6/2013 | Chang .................. | G06F 3/1454 709/231 |

FOREIGN PATENT DOCUMENTS

| | | |
|---|---|---|
| CN | 201571157 | 9/2010 |
| CN | 102723087 | 10/2012 |

OTHER PUBLICATIONS

Taiwan Patent Office, "Office Action," May 11, 2015.

* cited by examiner

*Primary Examiner* — Eileen Adams
(74) *Attorney, Agent, or Firm* — WPAT, PC; Justin King; Douglas Hosack

(57) ABSTRACT

A control chip for controlling a player with a multimedia playback function and a data processing function is provided. The control chip includes: a multimedia playback module, being adapted to drive the multimedia playback function, configured to generate multimedia playback information associated with multimedia data that has been played; a data processing module, being adapted to drive the data processing function, configured to generate data processing information associated with data that has been processed; and a data protection module, configured to control at least one of the multimedia playback module to stop the multimedia playback function and the data processing module to stop the multimedia playback function according to the multimedia playback information and the data processing information.

20 Claims, 2 Drawing Sheets

TELEVISION CONTROL CHIP HAVING DATA PROTECTION FUNCTION AND METHOD FOR CONTROLLING TELEVISION SET

This application claims the benefit of Taiwan application Serial No. 102136373, filed Oct. 8, 2013, the subject matter of which is incorporated herein by reference.

BACKGROUND OF THE INVENTION

1. Field of the Invention

The invention relates in general to a television control chip and a method for controlling a television set, and more particularly to a television control chip having a data protection function and associated method for controlling a television set.

2. Description of the Related Art

Most current multimedia contents are protected by copyrights. Thus, most multimedia playback apparatuses offer protection mechanisms for preventing or mitigating threats of piracy of the multimedia contents. Functions of commercial television sets continue to expand with the constant progress of technologies, and certain smart televisions even provide Internet functions. For those who intend to illegally obtain protected information, such function distinctly provides another data transmission channel, making the task of copyright protection even more challenging. Further, a smart television is usually equipped with an operating system, which inclines the smart television to invasions of malicious programs compared to conventional televisions. Malicious programs may sabotage a multimedia content protection mechanism built in the television set, and store the multimedia contents to an external storage apparatus outside the television via a storage interface of the television set, record the protected multimedia contents in a built-in storage apparatus via a personal video recorder (PVR) built-in the television set, or transmit the protected multimedia contents to a remote apparatus via the Internet.

In response to television sets with expanding functions, there is a need for a more comprehensive multimedia content protection mechanism for copyright protection.

SUMMARY OF THE INVENTION

The invention is directed to a television control chip having a data protection function and a method for controlling a television set, so as to prevent multimedia data from piracy when the television set plays the multimedia data.

The present invention discloses a control chip for controlling a player. The player at least includes a multimedia playback function and a data processing function. The control chip includes: a multimedia playback module, being adapted to drive the multimedia playback function, configured to generate multimedia playback information associated with multimedia data that has been played; a data processing module, being adapted to drive the data processing function, configured to generate data processing information associated with data that has been processed; and a data protection module, coupled to the multimedia playback module and the data processing module, configured to control at least one of controlling the multimedia playback module to stop the multimedia playback function and the data processing module to stop the data processing function.

The present invention further discloses a method for controlling a player with a multimedia playback function and a data processing function. The control method includes: generating multimedia playback information associated with multimedia data that has been played; generating data processing information associated with data that has been processed; and stopping at least one of the multimedia playback function and the data processing function according to the multimedia playback information and the data processing information.

The television control chip having a data protection function and the method for controlling a television set of the present invention are capable of protecting multimedia data from piracy. In the present invention, during a period in which the television set plays multimedia data, the amount of multimedia data that has been played within a predetermined period is recorded, and the recorded amount of multimedia data is compared with the amount of data that has been processed by the data processing function of the television set within the same period to determine whether potential data piracy is present. Using the data amount as a comparison basis, the present invention is applicable to different multimedia data formats. On the other hand, in the present invention, whether the data processing function of the television set is abnormally activated can also be monitored and determined while playing multimedia data to further determine whether a potential data piracy is present.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a television control chip having a data protection function and a method for controlling a television set to determine whether a potential data piracy is present in the television set. The television control chip and the method for controlling a television set are applicable to a television set having a data processing function, e.g., a data storage function, a network transmission function or a recording function. In possible implementation, one skilled person in the art may choose equivalent elements or steps to implement the disclosure based on the disclosure of the application. That is, the implementation of the disclosure is not limited by the embodiments disclosed in the disclosure. Further, a part of the elements included in the television control chip of the disclosure are individually known elements. Without affecting the full disclosure and possible implementation of the device, details of the known elements are omitted. Further, the image processing method of the present invention may be implemented by the television control chip of the disclosure or an equivalent device. Without affecting the full disclosure and possible implementation of the method of the disclosure, the description of the method focuses on the steps of the method instead of hardware.

Figure 1:
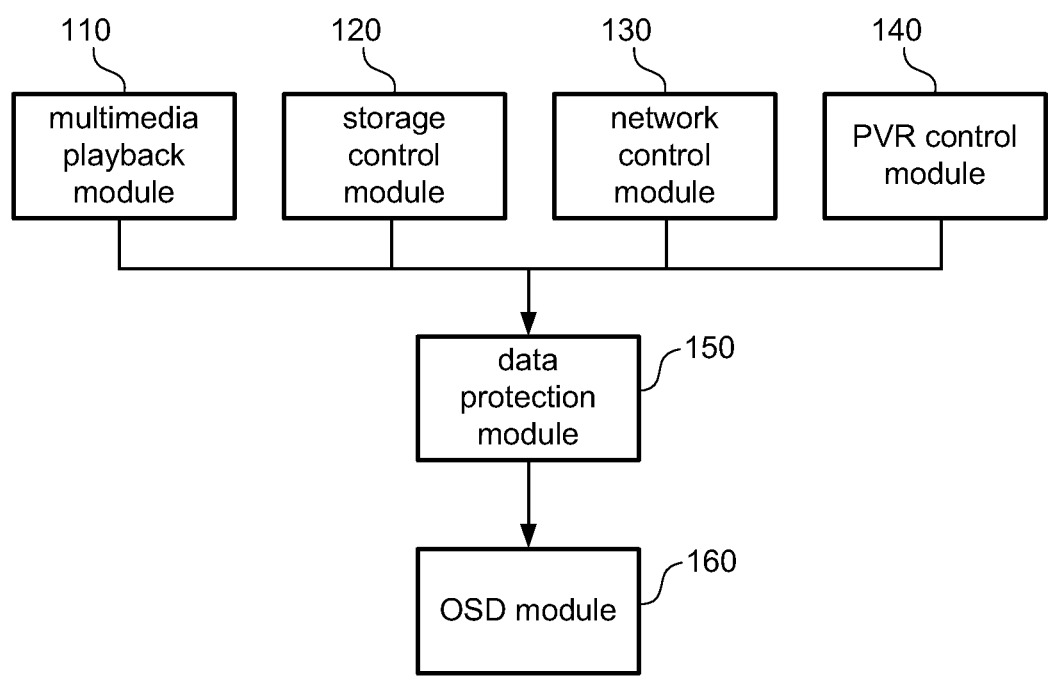
FIG. 1 is a functional block diagram of a television control chip according to an embodiment of the present invention.

FIG. 1 shows a functional block diagram of a television control chip according to an embodiment of the present invention. The television control chip includes a multimedia playback module 110 configured to drive a multimedia playback function of a television set, e.g., playing a real-time television program or playing multimedia data stored in a storage apparatus. During a playback process, multimedia data to be played is accessed from a buffer (not shown) and multimedia playback information is generated. The television control chip of the present invention is also applicable for controlling a television set having a data processing function. For example, the data processing function includes a data storage function, a network transmission function and a recording function. A storage control module 120 includes a driver program for a data storage interface, e.g., a driver program for Universal Serial Bus (USB) and/or a card reader access interface, to drive the data storage function of the television set to control operations of corresponding hardware, and to generate storage control information. For example, data is stored to a built-in storage apparatus, to an external hard drive via the USB, or to a memory card via the card reader access interface. A network control module 130 includes a driver program for a network access interface, e.g., a driver program for an Ethernet control interface and/or a Wi-Fi control interface, to drive the network transmission function of the television set to control operations of corresponding hardware, and to generate network control information. For example, via the Ethernet control interface or the Wi-Fi control interface, data is transmitted to an apparatus that connects to the television set via a network (including the Internet and LAN). A personal video recorder (PVR) control module 140 includes a driver program for a recording device to drive the recording function of the television set to control operations of corresponding hardware, and to generate recording control information. For example, with a video/audio capturing circuit, multimedia data that the television set is currently playing is captured, and stored to a built-in or external storage apparatus via a storage circuit. Each of the storage control module 120, the network control module 130 and the PVR control module 140 is in charge of a partial data process function of the television set, and the three may be regarded as data processing modules.

The television control chip according to an embodiment of the present invention further includes a data protection module 150. The multimedia playback module 110, the storage control module 120, the network control module 130 and the PVR control module 140 are all coupled to the data protection module 150. By monitoring the multimedia playback information of the multimedia playback module 110 and the data processing information that other data processing modules generate during operations, the data protection module 150 determines whether the television set is exposed to a risk of data piracy. The data processing information includes the storage control information of the storage control module 120, the network control information of the network control module 130 and the recording control information of the PVR control module 140. The multimedia playback information includes an amount of multimedia data that has been played by the multimedia playback module 110 within a predetermined period. The storage control information includes activation information of the storage control module 120, i.e., information of hardware that is driven and in charge of the data storage function in the television set, and further includes an amount of data that has been processed by the storage control module 120 within the same predetermined period.

The network control information includes activation information of the network control module 130, i.e., information of hardware that is driven and in charge of the network transmission function in the television set, and further includes an amount of data that has been processed by the network control module 130 within the same predetermined period. The recording control information generated by the PVR control module 140 similarly includes activation information of the PVR control module 140, i.e., information of hardware that is driven and in charge of the recording function in the television set, and further includes an amount of data that has been processed by the PVR control module 140 within the same predetermined period.

When implementing the multimedia playback module 110, the storage control module 120, the network control module 130 and the PVR control module 140, an application program interface (API), e.g., a callback function API, for controlling activation or deactivation of the corresponding module, may be added to a corresponding driver program layer or middleware layer to allow the data protection module 150 to control the activation or deactivation of the corresponding module through the API. In a preferred embodiment, such type of API may be set to have a highest permission level. That is, the corresponding module can be forcibly deactivated through such type of API. In the present invention, the middleware layer may be between the API layer and a driver program layer. If the television control chip includes an operating system, the middleware layer may then be included in or excluded from the operating system. The multimedia playback module 110, the storage control module 120, the network control module 130 and the PVR control module 140 may transmit respective operation information (the multimedia playback information, the storage control information, the network control information and the recording control information) to the data protection module 150. When the multimedia playback module 110 starts playing multimedia data, the data protection module 150 is activated. During the process of playing the multimedia data, the multimedia playback module 110 continually transmits the multimedia playback information to the data protection module 150, and the storage control module 120, the network control module 130 and the PRV control module 140 also at the same time continually transmit the respective data processing information to the data protection module 150. When the data protection module 150 discovers that the data processing information of the storage control module 120, the network control module 130 and the PRV control module 140 indicates an abnormal situation, the data protection module 150 stops the operations of the corresponding data processing module through the foregoing API, and/or simultaneously controls the multimedia playback module 110 to stop the playback. Further, in response to requirements of a television set manufacturer, in the event of an abnormal situation, the data protection module 150 may record the abnormal situation and forward the abnormal situation via a network to the television set manufacturer. Thus, reactive measures may be made with respect to the risk of piracy of the television set, e.g., updating firmware of the television set.

In a preferred embodiment, the abnormal situation is an abnormal activation of the storage control module 120, the network control module 130 and the PRV control module 140. For example, during the process of playing a television program, the network function of the television is set to stay deactivated. At this point, if the network control information that the data protection module 150 receives from the network control module 130 indicates that the network control module 130 is activated, it means an abnormal situation is taking place. That is, it is possible that a malicious program is sending out the multimedia data in the buffer via the network interface of the television set and thus violates the copyright of the multimedia data, or a malicious program is sending out information of the multimedia data such as name, rating and program summary and thus violates the user privacy.

The data protection module 150 may then stop the network control module 130 through the API, or even at the same time stop the multimedia playback module 110.

In another preferred embodiment, the abnormal situation is that an amount of data having been processed by the storage control module 120, the network control module 130 and the PRV control module 140 exceeds a predetermined value. For example, while playing multimedia contents of a video/audio compact disc, the storage control module 120 writes data to an external storage device. At this point, from the storage control information that the data protection module 150 receives from the storage control module 120, if the data protection module 150 learns that the amount of data that the storage control module 120 accesses within a predetermined period is equal to an amount of data or greater than a ratio (e.g., 50%) of an amount of data that the multimedia playback module 110 has played within the same predetermined period, it means that an abnormal situation is taking place. It is possible that a malicious program is storing the multimedia data in the buffer to a storage apparatus via the storage interface of the television set. The data protection module 150 may then stop the storage control module 120, or even at the same time stop the multimedia playback module 110.

Again referring to FIG. 1, the television control chip according to an embodiment of the present invention further includes an on-screen display (OSD) module 160 that controls an OSD of the television set. That is to say, the television set provides an information prompt function. The data protection module 150 is coupled to the OSD module 160. When an abnormal situation is discovered, the OSD module 160 may be controlled to display a message for warning the user.

Figure 2:
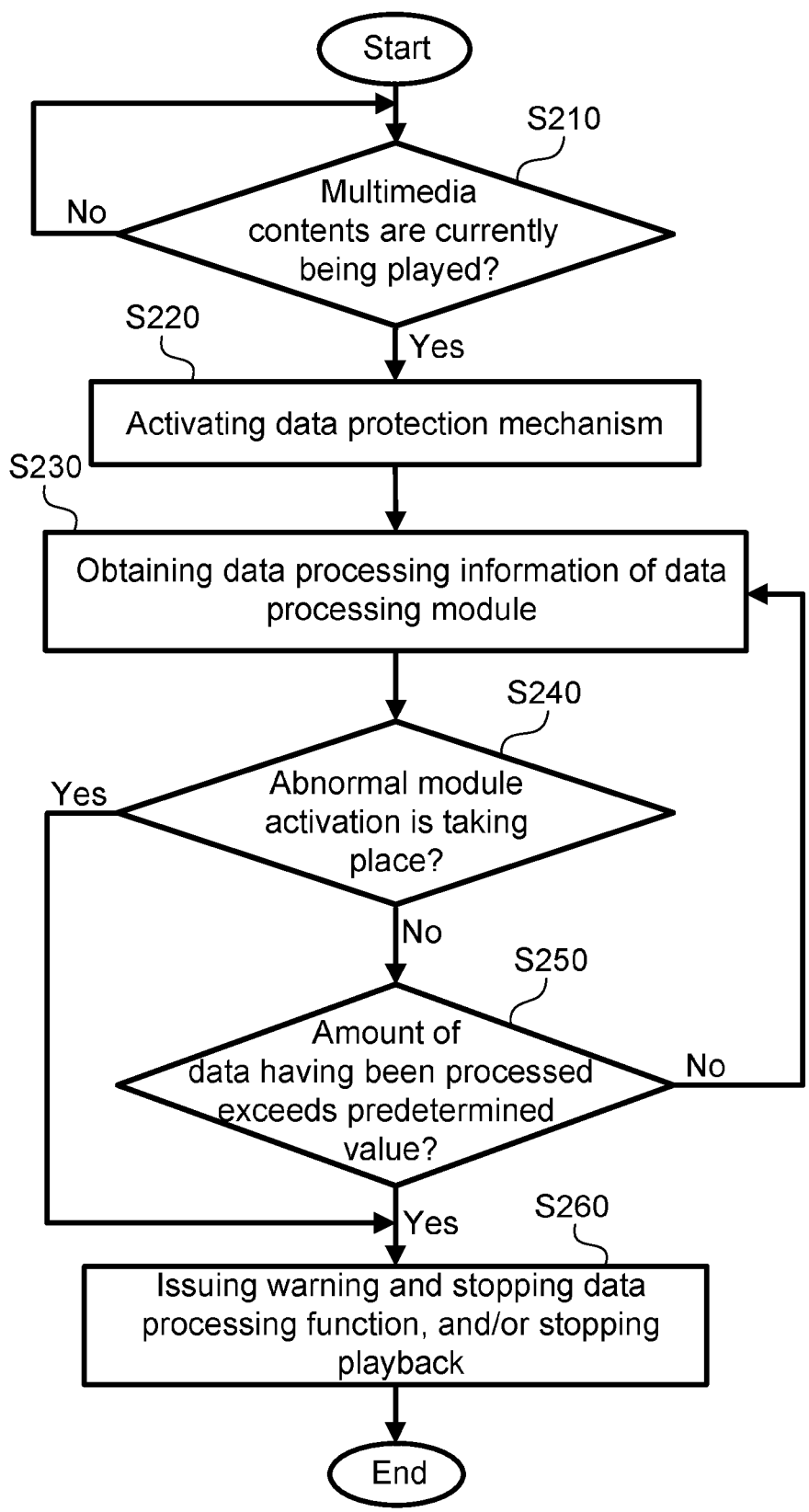
FIG. 2 is a flowchart of a method for controlling a television set according to an embodiment of the present invention.

FIG. 2 shows a flowchart of a method for controlling a television set according to an embodiment of the present invention. In addition to the television control chip, the present invention correspondingly discloses a method for controlling a television set having a data processing function to safeguard multimedia data. In a preferred embodiment, for example, the data processing function of the television set includes a data storage function, a network transmission function and a recording function. Correspondingly, the control chip of the television set includes a data processing module. More specifically, to correspond to the above preferred embodiments, the control chip of the television set includes a multimedia playback module, a storage control module, a network control module and a PRV control module. The method can be performed by the foregoing television control chip or an equivalent device. Referring to FIG. 2, the method according to an embodiment of the present invention includes following steps.

In step S210, it is determined whether the television set is currently playing multimedia contents. When the television set is playing multimedia contents of a television program or multimedia contents stored in a storage apparatus, it means that the multimedia playback function of the television set is activated, and multimedia playback information is generated. The process remains at this step to continue checking when the television set is not playing multimedia contents, or else proceeds to step S220.

In step S220, a data protection mechanism of the television set is activated. After activating the data protection mechanism, it is monitored whether an abnormal situation is present in the television set.

In step S230, data processing information of the data processing module is obtained. More specifically, during the process of multimedia playback, when the data processing function of the television set needs to be activated, a corresponding function is driven and corresponding data processing information is generated. For example, data needs to be stored during the process of multimedia playback, and so the data storage function is driven and data storage information is generated. This step may obtain the data processing information of a part or all of the above modules. The data processing information may include two types of information—an activation status of a module, and an amount of data that has been processed by the module within a predetermined period.

In step S240, it is determined whether any module is abnormally activated according to the data processing information generated by the data processing module. For example, when the television set is playing copyright-protected music data, the data storage function of the television set is expected to stay deactivated. At this point, if the storage control information of the storage control module indicates that the storage function is activated, it means that an abnormal module activation is taking place. The abnormal module activation may be regarded as an abnormal situation of the television set. Thus, the process proceeds to step S260 when the operation information of the module indicates an abnormal module activation, or else proceeds to step S250.

In step S250, it is determined whether an amount of data that has been processed by the module exceeds a predetermined value according to the data processing information generated by the data processing module. The predetermined value may be an amount of data that has been processed by the multimedia playback module within a predetermined period, i.e., an amount of data that has been played by the television set within the predetermined period, or a ratio of an amount of data that has been processed by the multimedia playback module within a predetermined period, e.g., 50%. Details of the abnormal situation are described in the disclosed television control chip of the present invention, and shall be omitted herein. When the amount of data that has been processed by the data processing module within the predetermined period exceeds the predetermined value, it means an abnormal situation is taking place, and the process proceeds to step S260. When the predetermined value is not exceeded, the process returns to step S230 to continue monitoring whether an abnormal situation takes places in the television set according to the data processing information generated by the data processing module.

In step S260, a warning is issued and the data processing function and/or the playback are/is stopped. In the event of an abnormal situation, an OSD of the television set may be used to warn the user, the data processing function causing the abnormal situation is stopped, and the multimedia playback module may be selectively stopped from further playing the multimedia data.

One person skilled in the art can understand details and possible implementation variations of the method in FIG. 2 according to the disclosure of the television control chip in FIG. 1. Without affecting the full disclosure and possible implementation, such repeated description is omitted herein. Further, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although the multimedia playback function, the data storage function, the network transmission function and the PVR function are taken as examples in the foregoing embodiments, based on the disclosure of the present invention, one person skilled in the art may appropriately apply the present invention to a television set having other data processing functions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control chip, for controlling a television with a multimedia playback function and a data processing function, the control chip comprising:
   a multimedia playback circuit, driving the multimedia playback function and configured to generate multimedia playback information by tracking an amount of multimedia data corresponding to a television program that has already been played;
   a data processing circuit, driving the data processing function comprising a data storage function, a network transmission function or a recording function, said data processing circuit configured to generate data processing information associated with an amount of data that has been processed; and
   a data protection circuit, coupled to the multimedia playback circuit and the data processing circuit, configured to control the data processing circuit through an application program interface to a corresponding driver program layer or middleware layer of the data processing circuit such that the television stops the data processing function, according to the multimedia playback information and the data processing information,
   wherein the multimedia playback circuit continually transmits the multimedia playback information to the data protection circuit, the data processing circuit continually transmits the data processing information to the data protection circuit, and when the amount of data that has been processed exceeds a predetermined value associated with the amount of multimedia data that has already been played, the data protection circuit controls the data processing circuit, such that the television stops the data processing function.

2. The control chip according to claim 1, wherein the multimedia playback information comprises an amount of multimedia data that has been played within a predetermined period, and the data processing information comprises an amount of data that has been processed within the predetermined period.

3. The control chip according to claim 2, wherein when the amount of data that has been processed within the predetermined period is greater than the predetermined value, the data protection circuit controls the data processing circuit, such that the television stops the data processing function.

4. The control chip according to claim 3, wherein the predetermined value is associated with the amount of multimedia data that has been played within the predetermined period.

5. The control chip according to claim 1, wherein the data processing information comprises information of the data processing function that is started to be driven.

6. The control chip according to claim 1, wherein the data protection circuit controls the data processing circuit such that the television stops the data processing function through a callback function, the callback function has a command for read and write operations having a highest permission level.

7. The control chip according to claim 1, wherein the data processing function is a data storage function, the television stores data to a storage apparatus by utilizing the data storage function, and the data processing circuit is a storage control module configured to drive the data storage function.

8. The control chip according to claim 1, wherein the data processing function is a network transmission function, the television transmits data to an apparatus connected to the television by utilizing the network transmission function, and the data processing circuit is a network control module configured to drive the network transmission function.

9. The control chip according to claim 1, wherein the data processing function is a recording function, the television records the multimedia data played by the television by utilizing the recording function and stores the recorded contents to a storage apparatus, and the data processing module is a recording control module configured to drive the recording function.

10. The control chip according to claim 1, the television further with an information prompt function, the control chip further comprising:
    an on-screen display (OSD) circuit, coupled to the data protection circuit, configured to drive the information prompt function;
    wherein, the data protection circuit controls the OSD circuit to drive the information prompt function according to the multimedia playback information and the data processing information.

11. A method for controlling a television with a multimedia playback function and a data processing function, the method comprising:
    generating multimedia playback information by tracking an amount of multimedia data corresponding to a television program that has already been played;
    generating data processing information associated with an amount of data that has been processed by a data processing function comprising a data storage function, a network transmission function or a recording function; and
    stopping the data processing function through an application program interface to a corresponding driver program layer or middleware layer when the amount of data that has been processed exceeds a predetermined value associated with the amount of multimedia data that has already been played.

12. The method according to claim 11, wherein the multimedia playback information comprises an amount of multimedia data that has been played within a predetermined period, and the data processing information comprises an amount of data that has been processed within the predetermined period.

13. The method according to claim 12, wherein when the amount of data that has been processed within the predetermined period is greater than the predetermined value, data processing function is stopped.

14. The method according to claim 13, wherein the predetermined value is associated with the amount of multimedia data that has been played within the predetermined period.

15. The method according to claim 11, wherein the data processing information comprises information of the data processing function that is started to be driven.

16. The method according to claim 11, wherein the step of stopping the data processing function according to the multimedia playback information and the data processing information is performed through a callback function, the callback function has a command for read and write operations having a highest permission level.

17. The method according to claim 11, wherein the data processing function is a data storage function, and the television stores data to a storage apparatus by utilizing the data storage function.

18. The method according to claim 11, wherein the data processing function is a network transmission function, and the television transmits data to an apparatus connected to the television by utilizing the network transmission function.

19. The method according to claim 11, wherein the data processing function is a recording function, and the television records the multimedia data played by the television by utilizing the recording function and stores the recorded contents to a storage apparatus.

20. The method according to claim 11, the television further with an information prompt function, the method further comprising:
    performing the information prompt function according to the multimedia playback information and the data processing information.

* * * * *